United States Patent [19]

Matelena

[11] 3,943,965
[45] Mar. 16, 1976

[54] PIPELINE FOR TRANSPORTING PETROLEUM PRODUCTS THROUGH TUNDRA

[76] Inventor: John J. Matelena, 3576 E. State St. Extension, Trenton, N.J. 08619

[22] Filed: Sept. 7, 1973

[21] Appl. No.: 395,375

[52] U.S. Cl. .................. 137/340; 62/55; 250/573; 340/242; 356/201; 73/40.5 R
[51] Int. Cl.² ...................... F17D 1/14; F16L 9/18
[58] Field of Search ......... 137/340, 13, 2, 236, 375; 250/573, 569, 564; 356/201; 138/114, 111, 115, 113; 62/55, 512, 513, 260; 165/143, 45; 166/57, DIG. 1; 48/190; 73/40, 40.5 R, 61.4; 340/242, 237

[56] References Cited
UNITED STATES PATENTS

| | | | |
|---|---|---|---|
| 2,206,214 | 7/1940 | Wicker | 356/201 |
| 2,244,507 | 6/1941 | Thomas | 250/564 |
| 3,495,915 | 2/1970 | Watson et al. | 356/201 X |
| 3,547,161 | 12/1970 | Reece | 138/114 |
| 3,586,484 | 6/1971 | Anderson | 73/61.4 X |
| 3,650,119 | 3/1972 | Sparling | 62/55 |
| 3,674,086 | 7/1972 | Foster | 165/45 |
| 3,679,315 | 7/1972 | Laucournet | 356/201 X |
| 3,685,583 | 8/1972 | Phares | 166/DIG. 1 |
| 3,721,270 | 3/1973 | Wittgenstein | 138/104 |
| 3,730,201 | 5/1973 | Lefever | 137/13 |
| 3,735,769 | 5/1973 | Miller | 137/340 X |
| 3,756,268 | 9/1973 | Lefever | 137/340 |

*Primary Examiner*—Martin P. Schwadron
*Assistant Examiner*—Robert J. Miller
*Attorney, Agent, or Firm*—Smith, Harding, Earley & Follmer

[57] ABSTRACT

A buried oil transportation pipeline is provided with a dual sheath for recirculating liquid coolant under pressure. The liquid coolant eliminates thermal interference with the environment, provides means for detecting oil leaks and for recovery of leaked oil, and further provides for improved oil throughput.

7 Claims, 4 Drawing Figures

PIPELINE FOR TRANSPORTING PETROLEUM PRODUCTS THROUGH TUNDRA

BACKGROUND OF THE INVENTION

This invention relates to pipelines, and particularly to an oil transportation pipeline especially adapted for use in transporting petroleum over long distances in an Arctic environment.

Because of the large petroleum resources available at the north slope of Alaska, a great deal of research and study has been undertaken in recent years in order to determine whether it would be feasible to construct an oil pipeline extending from the north slope of Alaska to a port on the south coast. One proposal, which has received a great deal of attention, relates to the construction of a 789 mile long pipeline extending from a point south of Prudhoe Bay on the north slope to Port Valdez. Numerous technical problems have to be overcome in the implementation of such a proposal. Undoubtedly, the greatest problem is the effect of the proposed pipeline on the Arctic environment, and the magnitude of the problem may be appreciated by reference to *Final Environmental Impact Statement, Proposed Trans-Alaska Pipeline*, Government Printing Office, 1972. Various other technical problems relating to construction and maintenance of the pipeline also exist.

In general, there are two types of pipeline construction, each of which has its own inherent problems.

Above-ground construction would result in a considerable disturbance to the Arctic wildlife. For example, an above-ground pipeline would constitute a barrier, preventing the normal movement of caribou, moose, sheep, musk-ox, and bison. It is believed that an above-ground pipeline would be particularly detrimental to caribou, since they are characteristically migratory, and their well-being depends upon movement to traditional calving and seasonal grazing areas. Although moose, sheep, musk-oxen and bison are not considered migratory in the same sense as caribou, they do undergo seasonal movements of a moderately extensive nature. Obstruction of the seasonal movements of these animals would reduce the utilization of their habitat and perhaps isolate essential components of their ranges.

The construction of an above-ground pipeline would also involve extremely high construction and maintenance costs. For example, millions of cubic yards of gravel and crushed rock would be required to construct a support for the pipeline. The obtaining and transportation of gravel and crushed rock would result in extremely high costs. Similarly, high costs would be involved in the construction of concrete pads, steel plates and sliding cradles to support the pipeline. In an above-ground pipeline, certain parts of the line would have to be buried, and this requirement would give rise to particularly complex and costly problems.

The maintenance of an above-ground pipeline would include the costs of repair of lightning damage, snow removal, the cost of repairing damage caused by vandalism and sabotage, and the cost of surveillance.

A buried pipeline, on the other hand, has its own inherent problems, perhaps the most significant of which is the effect of the pipeline temperature on the permafrost. Permafrost is frozen soil, much of which contains large quantities of frozen water. Its strength is dependent upon the frozen condition of its water content. Thus, if melting occurs, the permafrost may no longer provide support. Oil, on the other hand, only flows efficiently at relatively high temperatures, its viscosity varying inversely with temperature. Furthermore, at high flow rates, oil temperature may actually increase in the pipeline. An ordinary pipeline, buried in permafrost, would transmit heat to the permafrost, and possibly cause its own destruction by melting away its support. Even if adequate support remained, the application of heat by the pipeline to the permafrost over long periods of time would cause a pool of water to collect which would continue to grow into a large pond or "thaw bulb", possibly causing a great deal of damage to the pipeline and the environment.

Other problems inherent in buried oil pipeline are the difficulty in accommodating expansion and contraction which result from temperature changes, and the difficulty of detecting and repairing oil leaks.

A problem inherent in oil pipelines, whether above-ground or buried, is the limitation on throughput imposed by the maximum pressure-withstanding capacity of the pipeline.

The principal object of this invention is to provide a buried pipeline in which the aforementioned problems are overcome.

Briefly, the pipeline comprises an inner oil-carrying conduit surrounded by a series of annular evacuated chambers, the chambers being in turn surrounded by a pair of coaxial conduits in which a liquid coolant is recirculated under pressure.

The temperature of the liquid coolant is controlled so that the pipeline does not alter the condition of the permafrost in which it is buried even though the oil being transported in the pipeline may be at a very high temperature.

The control of the temperature of the coolant-carrying conduits limits their expansion and contraction, and expansion joints are provided in the pipeline to permit longitudinal expansion and contraction of the oil-carrying conduit and the surrounding vacuum sections.

The recirculating coolant is a transparent liquid which facilitates leak detection by photoelectric means. If oil in the central conduit leaks into the coolant system, photoelectric detectors, responding to the reduced transparency of the coolant, register the existence and approximate location of the leak. The photoelectric system may be used as a back-up for other leak detecting devices which are explained hereinafter in greater detail.

When oil leaks into the coolant system in large quantities, it may be recovered and returned to the oil conduit by oil recovery means located at the coolant pumping stations which are located at intervals along the pipeline.

Finally, the pressure of the coolant in the coolant conduits imposes an inward pressure on the exterior of the oil transporting conduit through the vacuum section structure, permitting the oil to reach higher pressures, and therefore higher flow rates, in the oil conduit, than in a conduit of equal size in a conventional single conduit pipeline.

Other objects will be apparent from the following detailed description when read in conjunction with the drawings.

DETAILED DESCRIPTION

Figure 1:
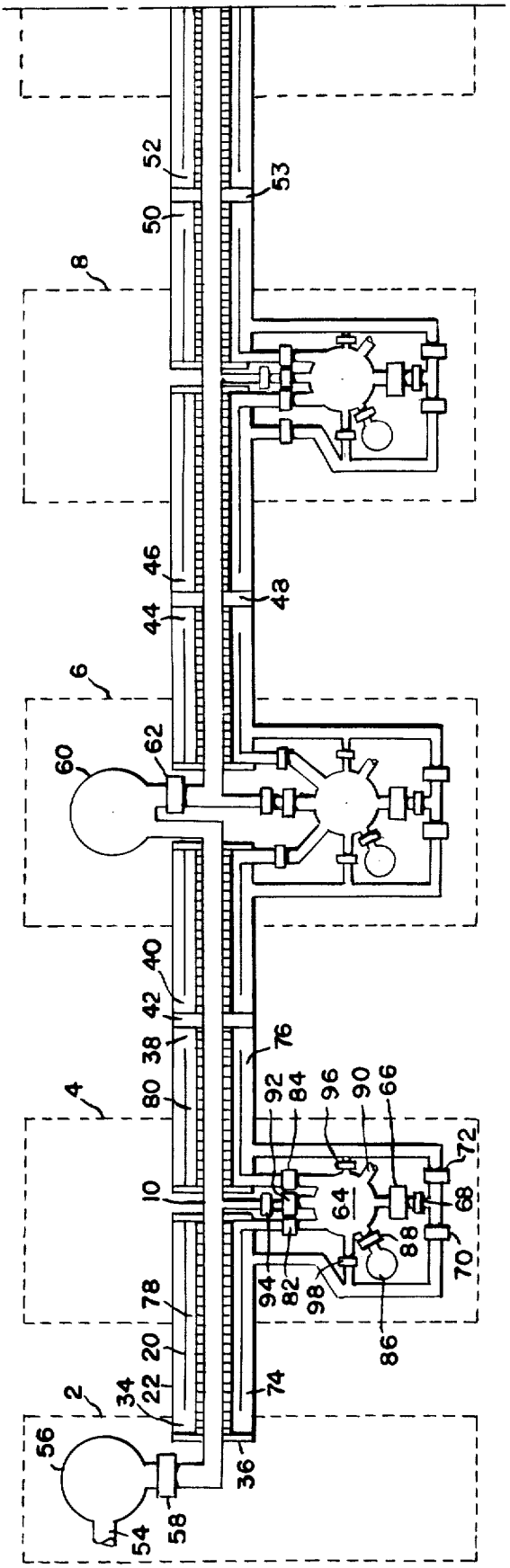
FIG. 1 is a diagram of several sections of pipeline in accordance with the invention showing oil pumping and coolant pumping stations.

FIG. 1 shows a portion of the pipeline extending from the inlet end to an intermediate point. An oil pumping station 2 is located at the inlet end, and typical intermediate pumping stations 4, 6 and 8 are shown, it being understood that in a typical pipeline numerous similar stations will be present along its length. Stations 4 and 8 are coolant pumping stations, and station 6 is a combined coolant and oil pumping station. Preferably, the coolant pumping stations and combined oil and coolant pumping stations are arranged in alternating sequence along the pipeline. However, as the pumping of oil is only necessary in order to build up oil pressure lost in the pipeline, under certain circumstances it may be possible to eliminate some of the oil pumps.

Figure 2:
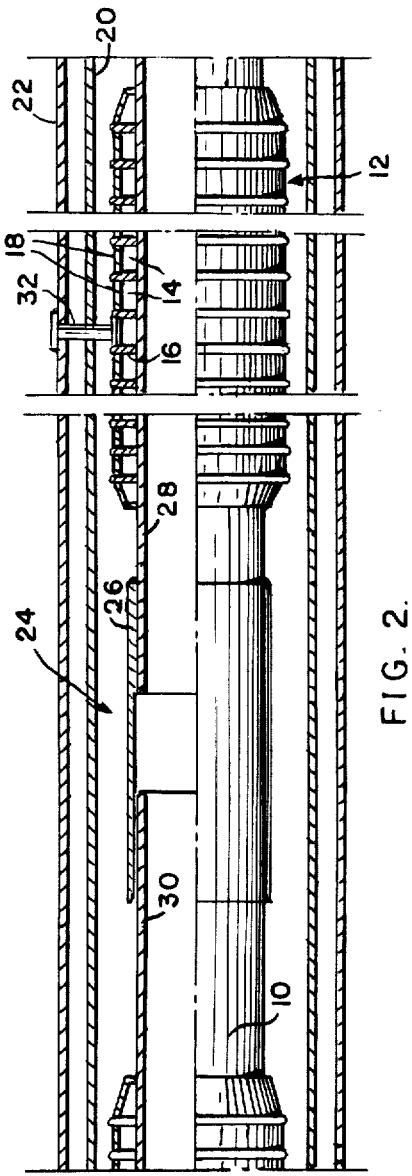
FIG. 2 is a longitudinal section of a length of pipeline in accordance with the invention.
Figure 4:
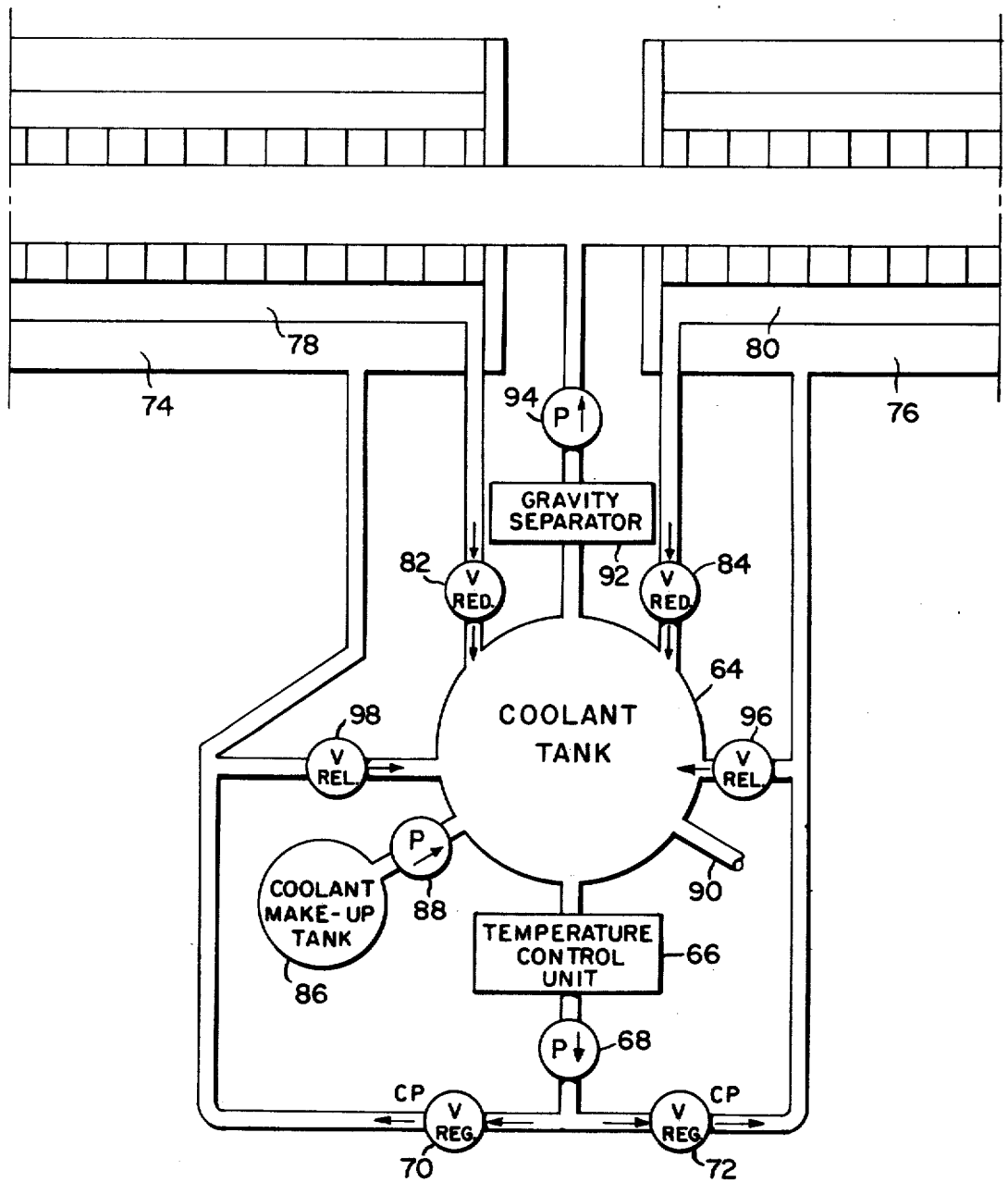
FIG. 4 is an enlarged view of a typical intermediate coolant pumping station corresponding to station 4 of FIG. 1.

Certain important details of the pipeline are illustrated in FIG. 2. The pipeline comprises an inner oil-carrying conduit 10 which, for the most part, is surrounded by an insulating structure 12 consisting of annular evacuated chambers such as those indicated at 14. These chambers are formed by welding ring-shaped plates such as plate 16 to the exterior of conduit 10, and enclosing chambers 14 by means of cylindrical elements 18, which are welded between the respective peripheries of plates 16. In a pipeline in which the outer diameter of conduit 10 is 48 inches, the outer diameter of the insulating structure 12 is typically approximately 52 inches, while the length of each evacuated chamber 14 is approximately 40 feet.

Coaxial with conduit 10 and spaced from it are a pair of conduits 20 and 22 which provide the path for recirculation of coolant. Conduit 20 is typically 60 inches in diameter, and conduit 22 is typically 68 inches in diameter.

As shown in FIG. 2, the insulating structure 12 is interrupted at intervals to provide for expansion joints for the oil-carrying conduit. A typical expansion joint is generally indicated at 24, and comprises a sleeve 26 welded to one section 28 of oil-carrying conduit and slidably engaged with section 30 of the conduit. Conventional packing means (not shown) are provided to insure against leakage of the joint.

The insulating structure 12 is secured to the outer conduits 20 and 22 by means of an anchor 32, preferably located approximately half way between expansion joints. The anchor insures against additive translation of successive sections on conduit 10, which could result in excessive opening or closing movements in certain of the expansion joints.

Returning to FIG. 1, conduits 20 and 22 are interconnected with each other at various points along the pipeline. The first interconnection is indicated at 34 next to end closure 36. A second interconnection is indicated at 38, a third interconnection is indicated at 40. The coolant paths at 38 and 40 are isolated from each other by separating means 42. Fourth and fifth interconnections are indicated at 44 and 46 respectively, and again, these are isolated from each other by separator 48.

Sixth and seventh interconnections are indicated at 50 and 52, and separating means is shown at 53.

Crude oil enters the pipeline system at inlet 54 of antisurge tank 56. The oil is pumped into conduit 10 by means of pump 58. The oil is collected at station 6 in antisurge tank 60, and is pumped back into the oil-carrying conduit by means of pump 62. Oil is again pumped at other combined coolant and oil pumping stations similar to station 6. These stations in a typical pipeline, are located at intervals determined by the topography, and the pressure of the pumping units. In the 789 mile Alaskan pipeline, the number of pumping stations will depend on the production of oil, pumping stations being added as production increases. For example, the pipeline could be put into operation with 5 pumping stations, with the number of pumping stations increased to 12 as production increases.

A coolant tank 64 in coolant pumping station 4 contains a coolant which preferably consists of a mixture of ethylene glycol and water, this mixture being preferred because it is transparent. The coolant passes out of tank 64, through a temperature control unit 66, which is primarily a refrigeration unit, although it may also be equipped with heating means if desired in order to keep oil in a fluid state in the event of an extended shutdown. The coolant is pumped by means of pump 68 into outer coolant channels 74 and 76, through regulating valves 70 and 72. The coolant flows through these channels, and through interconnections 34 and 38, and back through inner coolant channels 78 and 80. The coolant is returned to tank 64 through pressure reducing valves 82 and 84. The supply of coolant in tank 64 is maintained by pumping coolant into tank 64 from make-up tank 86 by means of pump 88. An overflow outlet is indicated at 90. The coolant pumping system at each of the remaining stations is similar to that just described. Overflow outlet 90 is connected to standby tanks (not shown).

In addition to the coolant recirculating means, each pumping station is provided with gravity-operated separating means, a typical separating means being designated 92 at station 4. The separating means is connected to the coolant tank 64, and separates from the coolant any oil which is returned to tank 64 with the coolant. Separated oil is returned to oil-carrying conduit 10 through pump 94. A pressure relief valve is provided between each outer coolant channel and its associated coolant storage tank. Typical relief valves are indicated at 96 and 98.

Figure 3:
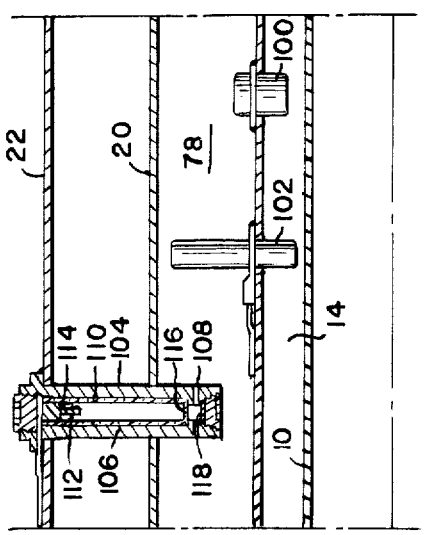
FIG. 3 is a longitudinal section of a pipeline illustrating a system of leak detectors.

The pipeline is preferably provided with a system of detectors for providing a warning in the event of oil leakage and also for indicating the location of a leak. As shown in FIG. 3, each vacuum chamber 14 is provided with a pressure-operated switch 100 and a hydrometer 102. The pressure-operated switch 100 is so arranged as to respond when the vacuum in vacuum chamber 14 is destroyed. Thus, if a leak of oil or coolant into the vacuum chamber 14 occurred, a signal would be provided by the pressure switch, and would be transmitted through a cable to a manned control station. Hydrometer 102 responds to the specific gravity of liquid in chamber 14, and provides two different signals, depending on whether the liquid entering the vacuum chamber 14 is oil or coolant. These signals are likewise delivered to a control station through a cable. The pressure switch and the hydrometer back each other up. Thus, if a signal is delivered by the hydrometer, while no signal is delivered by the pressure switch, the signal delivered by the hydrometer may be ignored. Likewise, if the pressure switch delivers a signal without a corresponding signal from the hydrometer, the signal from the pressure switch may be ignored. However, if both signals are present simultaneously, the pipeline operator may be confident that a leak has occurred into a vacuum section, and may record the failure of the vacuum section. Ordinarily, no repair would be undertaken immediately in the event of a leak such as just described, as the leakage of coolant or oil into a few vacuum sections would not materially affect the performance of the pipeline. The record which is kept, however, will be useful for predicting the locations of more serious failures, and also for scheduling routine maintenance.

Also shown in FIG. 3 is one of a large number of photoelectric sensing devices 104 which are spaced at intervals along the pipeline. Each sensor 104 comprises a tubular enclosure 106 extending inwardly through conduits 22 and 20 into coolant space 78. A horizontal passage 108 is provided in tube 106, and coolant in passage 78 is allowed to flow through passage 108. Within tube 106, there is located a transparent glass tube 110, in which are located a light source 112 and a photosensitive detector 114, for example a selenium photocell. Light emitted by light source 112 is transmitted downwardly through the end 116 of glass tube 110, through passage 108, and is reflected by mirror 118 back through passage 108 and through end 116 to the photosensitive detector 114.

Light source 112 may be energized by pulses or continuously. So long as light is received by photosensitive detector 114 at appropriate times, a signal is provided which indicates that the liquid in passage 108 is transparent, and therefore consists essentially of coolant. However, if an oil leak occurs such that oil passes entirely through a vacuum chamber upstream of sensor 104 with respect to the direction of flow of coolant in passage 78, then oil, mixed with coolant will pass through passage 108, and partially or completely block the light beam. When that happens, a signal is provided indicating a leak, still confined to the pipeline, but which requires corrective action. The resolution of the location of the leak is, of course, dependent upon the numbers of sensors 104. However, considering the information supplied by the pressure switches and hydrometers which are provided in each vacuum section, it will be apparent that a relatively small number of photoelectric sensors 104 will be sufficient to provide adequate information concerning the location of a leak in which oil passes entirely through the vacuum chamber. Thus, as few as one sensor 104 for every 15 or 20 vacuum sections would normally provide for accurate identification of the vacuum section at which a leak of oil into passage 78 occurred.

The principal advantage of the invention lies in the fact that at the pipeline, although buried in the ground, will not alter the condition of the permafrost. Rather, it allows the permafrost to follow its natural course of freezing and partial thawing. Preferably, the temperature of the area terrain in the vicinity of the pipeline and the temperature of the permafrost immediately adjacent the pipeline are monitored. When the temperature of the area terrain and the permafrost adjacent the pipeline are both below the freezing point of water, the temperature control unit 66 is not activated. If the area terrain is at the freezing point of water or at a lower temperature, and the permafrost surrounding the buried pipeline is thawing, the temperature units 66 are activated to reduce the temperature of the coolant in the outer channel, thus restoring the temperature of the permafrost to the freezing point of water. Finally, if the area terrain is in a thawing condition, the temperature control units will cause coolant to recirculate at a temperature above the freezing point of water.

Another important advantage of the invention lies in the fact that the use of a transparent coolant circulating in a coolant channel surrounding the oil-carrying conduit, facilitates the detection of oil leaks by allowing the use of optical detection means. The use of recirculating coolant also has the advantage that it provides for the entrapment of oil leaking out of the oil-carrying conduit and the recovery and reintroduction of leaking oil into the oil-carrying conduit. The coolant channels, which are normally operated under a pressure partway between atmospheric pressure and the pressure of the oil within the oil-carrying conduit, and typically at a pressure of about 500 pounds per square inch, exert an inward pressure on the oil-carrying conduit which effectively increases the pressure-withstanding capacity of the oil-carrying conduit, thereby permitting increased oil throughput.

Other advantages of the invention include the fact that expansion is reduced by temperature control and accommodated in a pipeline which extends substantially in a straight line; and the ability of the pipeline to maintain oil in a fluid state (even in the event of an extended shut-down) by reason of the insulation provided by vacuum sections, aided by the temperature controlled circulating coolant in the coolant conduits, which may be warmed up to, but not exceeding, 32°F if necessary to maintain the oil above its jelling temperature of approximately 15°F. Finally, there are the advantages of long life expectancy and relatively low maintenance cost.

While the pipeline is primarily useful for the transportation of oil, it is also suitable for use in transporting cooled or liquefied natural gas by reason of the exceptionally good insulation afforded by the evacuated sections and the recirculating coolant.

I claim:

1. A pipeline comprising a conduit for containing a fluid to be transported, means surrounding said conduit for transporting an optically transparent fluid, pumping means for causing said optically transparent fluid to flow through said means surround said conduit, means for directing a beam of light into said optically transparent fluid within said means surrounding said conduit, and photosensitive means for receiving said beam of light after said beam passes through a portion of said optically transparent fluid, whereby the leakage of a fluid from the interior of said conduit into the optically transparent fluid may be detected by said photosensitive means by reason of a change in the optical density of the fluid within said means surrounding said conduit.

2. A pipeline for transporting oil at a temperature higher than that of the pipeline environment while minimizing interference with said environment comprising an oil-carrying conduit for containing the oil to be transported, a plurality of independent coolant-recirculating sections located along the length of the pipeline, each said coolant-recirculating section comprising:

a first coolant-carrying conduit extending along and surrounding the oil containing conduit;

a second coolant-carrying conduit extending along the oil containing conduit, the second coolant-carrying conduit being substantially coextensive with and surrounding the first coolant-carrying conduit;

means closing the ends of said first and second conduits;

means, located adjacent one of said closing means, for providing an interconnection between said first and second conduits to allow flow of coolant therebetween;

pumping means, interconnected with said first and second conduits at a location remote from said interconnection-providing means, for withdrawing coolant from one of said first and second conduits and introducing the withdrawn coolant into the other of said first and second conduits, and means connected to said pumping means for separating oil from withdrawn coolant and for injecting the separated oil into the oil-carrying conduit and means connected in series with the pumping means for refrigerating said coolant prior to its introduction into said other of said first and second conduits.

3. A pipeline according to claim 2 in which at least a substantial part of the oil-carrying conduit is surrounded by evacuated insulation means for reducing the conduction of heat from the oil-carrying conduit to the first coolant-carrying conduit.

4. A pipeline according to claim 2 in which the pumping means is arranged to withdraw coolant from the first conduit and to introduce said coolant into the second conduit.

5. A pipeline according to claim 2 including means responsive to the optical density of the fluid in the first coolant-carrying conduit for providing a signal indicative of an oil leak when oil from the oil-carrying conduit leaks into the coolant-carrying conduits.

6. A pipeline according to claim 2 including means connected in series with the pumping means for warming the coolant to a temperature between 15°F and 32°F prior to its introduction into said other of said first and second conduits.

7. A pipeline for transporting oil at a temperature higher than that of the pipeline environment while minimizing interference with said environment comprising an oil-carrying conduit for containing the oil to be transported, and a plurality of independent coolant-recirculating sections located along the length of the pipeline, each said coolant-recirculating section comprising:

a first coolant-carrying conduit extending along and surrounding the oil-containing conduit;

a second coolant-carrying conduit extending along the oil-containing conduit, the second coolant-carrying conduit being substantially coextensive with and surrounding the first coolant-carrying conduit;

means closing the ends of said first and second conduits;

means, located adjacent one of said closing means, for providing an interconnection between said first and second conduits to allow flow of coolant therebetween;

pumping means, interconnected with said first and second conduits at a location remote from said interconnection-providing means, for withdrawing coolant from one of said first and second conduits and introducing the withdrawn coolant into the other of said first and second conduits; and means responsive to the optical density of the fluid in the coolant-carrying conduits for providing a signal indicative of an oil leak when oil from the oil-carrying conduit leaks into the coolant-carrying conduits.

* * * * *